United States Patent

[11] 3,542,044

[72] Inventors Gerald D. Hansen
Holicong;
Leonard J. Persinski; Alan Bischof; John J. Padden, Pittsburgh, Pennsylvania
[21] Appl. No. 588,655
[22] Filed Sept. 22, 1966
[45] Patented Nov. 24, 1970
[73] Assignee Calgon Corporation,
a corporation of Delaware. by mesne assignments

[54] FRICTION REDUCING COMPOSITIONS FOR OIL-BASED FRACTURING FLUIDS
4 Claims, No Drawings

[52] U.S. Cl. .................................................. 137/13,
166/308, 252/8.55
[51] Int. Cl. .................................................. F17d 1/16,
E21b 43/26
[50] Field of Search ........................................ 252/8.5C,
8.55A; 166/42.1, 308; 137/13

[56] References Cited
UNITED STATES PATENTS

| | | | |
|---|---|---|---|
| 3,017,351 | 1/1962 | Scott et al. | 252/8.5 |
| 3,122,203 | 2/1964 | Hawkins | 166/44X |
| 3,215,154 | 11/1965 | White et al. | 252/8.55X |
| 3,254,719 | 6/1966 | Root | 166/42 |
| 3,378,074 | 4/1968 | Kiel | 137/13X |

*Primary Examiner*—Herbert B. Guynn
*Attorney*—William L. Krayer

ABSTRACT: A composition for and a method of reducing energy loss during flow of oil through a pipe is provided which comprises adding to said oil in aqueous polyacrylamide solution preferably containing a dispersing agent.

FRICTION REDUCING COMPOSITIONS FOR OIL-BASED FRACTURING FLUIDS

This invention relates to compositions useful for enhancing the flow of oil-based fluids. Specifically, it relates to compositions containing polyacrylamide, a dispersing agent, and other compounds, and to the reduction of fluid flow friction therewith. It is particularly useful in the reduction of "friction loss" in fracturing oil field formations.

In an oil well fracturing operation, a fracturing fluid is forced down a well bore hole under high pressure and at high flow rates, causing the rock formations surrounding the well bore to fracture. The pressure is then relieved, allowing the oil to seep through the fractures into the well bore where it is pumped to the surface. Almost any liquid may be used as a fracturing fluid; for example, one may use water, brine or crude oil produced from nearby wells. This invention relates only to oil-based fracturing fluids, which are fluids such as oil, crude oil, treated oil, kerosene, diesel oil, and the like or any of these fluids in combination with water or brine.

The amount of oil which can be obtained from a well, particularly in secondary recovery, depends to a great extent upon how extensively the rock formations can be fractured. This, in turn, depends in part upon the rate at which fluid can be pumped into the fractured porous rock formation. Due to friction between the fracturing fluid and the oil well piping or rock and in the fracturing fluid itself because of turbulent flow, the fluid flow rate attainable with a given pump pressure may be considerably less than is desirable. Much of the energy input to the pump is lost before the fracturing fluid ever reaches its point of use. This problem is attacked by adding a friction reducer to the fracturing fluid. See, for example, Smith, Seichter, and Adler, U.S. Pat. No. 3,102,548; Dever, Harbour and Seifert, U.S. Pat. No. 3,023,760; Miller and Willson U.S. Pat. No. 3,105,047; and Clark and Shapiro, U.S. Pat. No. 2,533,878. A good friction reducer will cause a large decrease in friction in small concentrations, will be inexpensive, and will have high shear, temperature, and pressure stability.

An oil-based friction reducer in common use today is high molecular weight polyisobutylene. Polyisobutylenes are not readily dispersible and are sensitive to shear and high temperature so that dissolution by heating and stirring will cause them to lose effectiveness as friction reducers. Also, the maximum friction reduction attainable is not very high and it varies widely under differing conditions.

Progress toward finding a really effective friction reducing compound for oil has been retarded by the common assumption that such a compound should be soluble in oil and other hydrocarbons. We have found, however, that a polymer-based friction reducing compound need not be oil soluble.

We have formulated compositions which are very useful for reducing friction in oil-based fracturing fluids. Our basic composition consists of about 85 percent to 99.8 percent water, about 0.1 percent to 10 percent polyacrylamide, and about 0.1 percent to 10 percent dispersing agent; preferably, it consists of about 96–99 parts by weight water, about 1–3 parts polyacrylamide, and about 0.1–15 parts dispersing agent. We have found that the use of a quantity of water and a dispersing agent with polyacrylamide produces an oil-compatible system. The polyacrylamide should be of a high molecular weight, preferably at least 3 million. It should also have about 5 percent to about 40 percent or more (preferably 35 percent) of its amide groups hydrolyzed to carboxylic groups. This may be accomplished by treating the polymer with caustic as is known in the art.

The dispersing agent is an anionic or nonionic surface active agent. Examples of commercially available dispersing agents include "Pluronic L-81", "Aromox T-12", "Brij 35", and "Span 60". Any nonionic dispersing agent may be used. Examples of commercially available materials which may be used are listed in the following table.

| Trademark | Manufacturer | Chemical Structure |
|---|---|---|
| Span 80 | Atlas Chemical Ind. | Sorbitan monooleate. |
| Atpet 200 | do | Sorbitan partial fatty esters. |
| Arlacel C | do | Sorbitan sequioleate. |
| Tween 85 | do | Polyoxyethylene sorbitan trioleate. |
| Tween 81 | do | Polyoxyethylene sorbitan monooleate. |
| Tween 20 | do | Polyoxyethylene sorbitan monolaurate. |
| Tween 80 | do | Polyoxyethylene sorbitan monooleate. |
| Myrj 52 | do | Polyoxyethylene stearate. |
| Renex 697 | do | Ethoxylated nonyl phenol. |
| Atlas G-3284 | do | Polyoxyethylene sorbitol tallow esters. |
| Myrj 45 | do | Polyoxyethylene stearate. |
| Atlas G-1086 | do | Polyoxyethylene sorbitol hexaoleate. |
| Arlacel 80 | do | Sorbitan monoleate. |
| Triton X-100 | Rohm & Haas Co. | Isooctyl phenyl polyethoxy ethanol. |
| Pluronic L-103; L-92; L-81; L-101; L-61; L-72; F-108. | Wyandotte Chem. Corporation. | A condensate of ethylene oxide with a hydrophobic base formed by condensing propylene oxide with propylene glycol. |
| Brij 30 | Atlas Chem. Ind. | Polyoxyethylene (4) lauryl ether. |
| L-77 | Union Carbide | Organo Silicone. |
| FC-176 | 3M | Flurocarbon. |
| Arosurf EO-74 | Archer-Daniels-Midland. | Long chain fatty alcohol ethylene oxide. |
| Syn-O-Tol LO-80 | Drew Chemical Co. | Linoleic diethanolamide. |
| Span 60 | Atlas Chemical Ind. | Sorbitan monostearate. |
| Renex 31 | do | Polyoxyethylene ether alcohol. |
| Poesho | do | Polyoxyethylene sorbitol hexaoleate. |

We have performed experiments which demonstrate the effectiveness of our basic composition in reducing friction in oil-based fluids. In these experiments, 10 liters of oil-based fluid was continuously circulated at essentially constant flow rate and in highly turbulent flow through a 7-foot steel pipe having a 0.259 inch I.D. By means of gauges near each end of the pipe, the pressure drop between the gauging points was graphically recorded. A quantity of one of our basic compositions was added to the oil-based fluid and the decrease and subsequent return to normal of the pressure drop was recorded. The amount by which pressure drop decreases is recorded as a percentage of the normal value. Unless otherwise stated, the examples and tables herein show results obtained with this procedure.

Table I gives the results of experiments on kerosene. Stability is the length of time that the friction reduction remained over 50 percent.

TABLE I.—FRICTION REDUCTION USING BASIC COMPOSITION

[10 liters kerosene, 3 gm. polyacrylamide (35% hydrolyzed) 300 ml. H₂O]

| Dispersing agent | | Maximum friction reduction (percent) | Stability (min.) |
|---|---|---|---|
| Type | Quantity (gm.) | | |
| Pluronic L-81 | 12 | 60+ | 55+ |
| Do | 8 | 60+ | 100+ |
| Aromox T-12 | 5 | | |
| Do | 12 | 60+ | 40+ |
| Pluronic L-81 | 8 | 50+ | 150 |
| Aromox T-12 | 8 | | |

Pluronic L-81 is a block polymer of polyoxyethylene and polyoxypropylene, a product of Wyandotte Chemicals Corporation; Aromox T-12 is bis(2-hydroxyethyl)alkayl-amine oxide.

Table II demonstrates that various types of dispersants may be used.

TABLE II

[Effect of Various Dispersant Types on the Friction Reducing Properties of Experimental Friction Reducer[1] in 4 Gal. of Kerosene]

| Run No. | Dispersant | Grams | | Milliter | | | Maximum percent friction reduction |
|---|---|---|---|---|---|---|---|
| | | Dispersant | Polyacryl-amide | Isopropyl alcohol | Glycerol | Water | |
| 62 | Renex 697 | 18.2 | 4.55 | 205 | | 250 | 76.0 |
| 63 | Atlox 3396 | 18.2 | 4.55 | 205 | | 250 | 76.0 |
| 64 | Renex 648 | 18.2 | 4.55 | 205 | | 250 | 73.0 |
| 65 | G3284 | 18.2 | 4.55 | 205 | | 250 | 74.0 |
| 66 | Emcol 511 | 18.2 | 4.55 | 205 | | 250 | 74.0 |
| 67 | G-3300 | 18.2 | 4.55 | 205 | | 250 | 74.0 |
| 68 | Myrj-45 | 18.2 | 4.55 | 205 | | 250 | 74.0 |
| 69 | Doc-3 | 18.2 | 4.55 | 205 | | 250 | 74.0 |
| 70 | Morflo | 36.4 | 4.55 | 205 | | 250 | 0 |
| 71 | Hyflo | 18.2 | 4.55 | 205 | | 250 | 72.0 |
| 72 | Cra-10 | 18.2 | 4.55 | 205 | | 250 | 0 |
| 73 | Poesho | 18.2 | 4.55 | | 205 | 250 | 72.0 |
| 74 | do | 18.2 | 4.55 | | 205 | [2] 250 | 73.0 |

[1] High speed dispersator on powerstat setting 85.0; temp. 80° F.
[2] Distilled water.

The experiments shown in Table III utilized crude oil rather than kerosene as a test fluid.

TABLE III.—FRICTION REDUCTION USING BASIC COMPOSITION

[10 liters crude oil]

| Polyacrylamide hydrolyzed 35% (gm.) | Water (ml.) | Dispersing agent | | Max. fric. reduction (percent) | Stab. (min.) |
|---|---|---|---|---|---|
| | | Type | Quantity (gm.) | | |
| 9 | 500 | Pluronic L-81 / Aromox T-12 | 0.5 / 0.5 | 53 | 50 |
| 6 | 300 | Pluronic -L81 / Aromox T-12 | 1 / 1 | 57 | 40 |
| 6 | 300 | Pluronic L-81 | 1 | 57 | 35 |
| 6 | 300 | Span 60 / Brij 35 | 1 / 1 | 55 | 20 |
| 6 | 300 | Pluronic L-81 / Aromox T-12 | 0.5 / 0.5 | 51 | 35 |
| 9 | 500 | Pluronic L-81 / Aromox T-12 | 0.5 / 0.5 | 53 | 70 |

Span 60 is sorbitan monostearate, a product of Atlas Chemical Industries; Brij 35 is polyoxyethylene lauryl ether, a product of Atlas Chemicals Industries.

Table IV illustrates that our compositions are effective not only in kerosene but on various types of crude oils.

TABLE IV.—FRICTION REDUCING PROPERTIES OF EXPERIMENTAL FRICTION REDUCER IN CRUDE OILS

| Crude oil | API gravity | Friction reducer formulation, grams | | | | Ml. water | Maximum percent friction reduction | Time to reach ¾ of max. percent fric. reduc./min. |
|---|---|---|---|---|---|---|---|---|
| | | Polyacrylamide | Aromox T-12 | Pluronic L-81 | Calgon | | | |
| Kerosene | (Control) | 9.1 | 3.03 | 3.03 | 3.03 | 455 | 72 | 103 |
| | | 9.1 | | | | 455 | 18 | |
| | | 9.1 | | | 3.03 | 455 | 19 | |
| Penrose | 37.0 | 9.1 | 3.03 | 3.03 | 3.03 | 455 | 62 | 21 |
| | | 9.1 | 3.03 | 3.03 | 6.06 | 455 | 62 | 30 |
| | | 9.1 | 3.03 | 3.03 | 9.09 | 455 | 60 | 28 |
| | | 9.1 | 6.06 | 6.06 | 6.06 | 455 | 66 | 22 |
| | | 9.1 | 1.51 | 1.51 | 6.06 | 455 | 62 | 46 |
| | | 9.1 | | | 6.06 | 455 | 35 | 41 |
| | | 9.1 | 0.75 | 0.75 | 6.06 | 455 | 62 | 48 |
| | | 9.1 | | 0.75 | 6.06 | 455 | 66 | 8 |
| | | 9.1 | | | | 455 | 50 | 19 |
| Cleveland | 39.1 | 9.1 | 3.03 | 3.03 | 3.03 | 455 | 61 | 15 |
| | | 9.1 | 1.51 | 1.51 | 6.06 | 455 | 61 | 19.5 |
| | | 13.6 | 1.51 | 1.51 | 6.06 | 455 | 66 | 54 |
| Gainesville | 40.7 | 9.1 | 3.03 | 3.03 | 3.03 | 455 | 70 | 74 |
| | | 9.1 | 1.50 | 1.50 | 3.03 | 455 | 70 | 77 |
| | | 9.1 | | 1.50 | 3.03 | 455 | 62 | 70 |
| | | 9.1 | 3.03 | 3.03 | 6.06 | 455 | 68 | 51 |
| | | 9.1 | | | | 455 | 63 | 31 |
| | | 9.1 | | | 3.03 | 455 | 62 | 80 |
| Brinebry | 39.7 | 9.1 | 3.03 | 3.03 | 3.03 | 455 | 67 | 116 |
| | | 9.1 | 1.50 | 1.50 | 3.03 | 455 | 56 | 111 |
| | | 9.1 | | 1.50 | 3.03 | 455 | 53 | 93 |
| | | 9.1 | 3.03 | 3.03 | 6.06 | 455 | 67 | 93 |

TABLE IV.—FRICTION REDUCING PROPERTIES OF EXPERIMENTAL FRICTION REDUCER IN CRUDE OILS—continued

| Crude oil | API gravity | Friction reducer formulation, grams | | | | Ml. water | Maximum percent friction reduction | Time to reach ¾ of max. percent fric. reduc./min. |
|---|---|---|---|---|---|---|---|---|
| | | Poly-acrylamide | Aromox T-12 | Pluronic L-81 | Calgon | | | |
| ABO | 42.0 | 9.1 | 3.03 | 3.03 | 3.03 | 455 | 71 | 57 |
| Golden Frac Oil | 25.5 | 9.1 | 3.03 | 3.03 | 3.03 | 455 | 19 | |
| | | 9.1 | 3.03 | 3.03 | 3.03 | 455 | 30 | 9 |
| | | 9.1 | 1.50 | 1.50 | 3.03 | 455 | 64 | 2 |
| | | 9.1 | | 3.03 | 3.03 | 455 | 67 | 6 |
| Grayburg | 36.1 | 9.1 | 3.03 | 3.03 | 6.06 | 455 | 67 | 30+ |
| | | 9.1 | 3.03 | 3.03 | 6.06 | 455 | 68 | 70 |
| | | 9.1 | 1.50 | 1.50 | 6.06 | 455 | 66 | 75 |
| | | 9.1 | | 3.03 | 6.06 | 455 | 68 | 83 |
| | | 9.1 | | | 6.06 | 455 | 52 | 66 |
| Queens | | 9.1 | | | | 455 | 54 | 10 |
| | | 9.1 | | | 3.03 | 455 | 58 | 36 |

NOTES:
(1) All runs are with dispersator on powerstat setting 85.
(2) Formulations as shown were mixed into 4 gallons of base fluid.

We have found that the effectiveness of our basic composition may be increased by adding a coupling agent to it.

Our coupling agent composition consists of about 90 percent to 98.4 percent water, about 0.1 percent to 10 percent polyacrylamide, about 0.1 percent to 10 percent dispersing agent, and about 1.4 percent to 14 percent coupling agent; preferably it consists of about 95 percent to 99 percent water, about 1 percent to 3 percent polyacrylamide, about 0.1 percent to 1 percent dispersing agent, and about 3 percent to 8 percent coupling agent. A coupling agent is a compound which has an affinity for both water and an oil-based fracturing fluid. We prefer a monofunctional alcohol having 3 to 5 carbon atoms, or a polyfunctional alcohol. Examples of coupling agents include; isopropyl alcohol, glycerine, polyvinyl alcohol and ethanol.

Alternately stated, our composition may comprise:

| | Parts by weight |
|---|---|
| Water | 200–500 |
| Isopropanol | 40–60 |
| Glycerine | 5–65 |
| Dispersing Agent | 0.1–17 |
| Sodium metaphosphate | Up to 10 |
| Hydrolyzed polyacrylamide | 2–9 |

Experiments similar to those already described were performed using our coupling agent composition. Table V gives the results of these experiments where kerosene was the oil-based fluid, and Table VI gives the results where crude oil was used.

TABLE V.—FRICTION REDUCTION USING COUPLING AGENT COMPOSITION

[10 l. kerosene]

| Polyacrylamide hydrolized 35% (gm./10 l.) | Water (ml./10 l.) | Coupling agent | | Dispersing agent | | Maximum friction reduction (percent) | Stability (min.) |
|---|---|---|---|---|---|---|---|
| | | Type | Quantity (ml./10 l.) | Type | Quantity (gm./10 l.) | | |
| 3 | 300 | PVA-165 | (¹) | Pluronic L-81 / Aromox T-12 | 8 / 5 | 50+ | 200 |
| 3 | 165 | Isopropanol | 135 | Peosho | 12 | 72 | 90+ |
| 6 | 330 | do | 270 | do | 12 | 73 | 120+ |
| 6 | 110 | do | 90 | do | 8 | 66 | 32 |
| 1.5 | 110 | Isopropanol / Glycerol | 90 / 50 | do | 8 | 68 | 30 |
| 3 | 220 | Isopropanol | 180 | do | 16 | 70 | 60+ |
| 3 | 165 | do | 135 | do | 16 | 68 | 55 |
| 3 | 165 | do | 135 | do | 11 | 65 | 50 |
| 3 | 165 | do | 135 | Poepop-2 | 10 | 65 | 65+ |
| 3 | 110 | do | 120 | Poesho | 16 | 64 | 45 |
| 3 | 110 | do | 90 | do | 8 | 65 | 45 |
| 5 | 110 | do | 90 | do | 8 | 65 | 45 |

¹ 2 g m.

NOTES: PVA-165 is polyvinylacetate alcohol, a product of Air Reduction.
Poepop-2 is 10% polyoxyethylene, 90% polyoxypropylene (medium molecular weight), a product of Atlas Chemical Ind.

TABLE VI.—FRICTION REDUCTION USING COUPLING AGENT COMPOSITION

[10 l. crude oil]

| Polyacrylamide hydrolized 35% (gm./10 l.) | Water (ml./10 l.) | Coupling agent Type | Coupling agent Quantity (ml./10 l.) | Dispersing agent Type | Dispersing agent Quantity (ml./10 l.) | Maximum friction reduction (percent) | Stability (min.) |
|---|---|---|---|---|---|---|---|
| 3 | 100 | Glycerol | 50 | Aromox T-12 | 1 | 54 | 35 |
| 5 | 300 | do | 5 | {Pluronic L-81<br>Aromox T-12} | {1<br>0.5} | 52 | 35 |
| 6 | 300 | do | 20 | Pluronic L-81 | 1 | 56 | 70 |

Most oil-based fracturing fluids contain small concentrations of various polyvalent cations, especially calcium. Since cations sometimes interfere with the effectiveness of our compositions in reducing friction, it is desirable to include about 0.1 percent to 1 percent compatible chelating agent in both the basic and coupling agent compositions; preferably, about 0.3 percent to 0.4 percent chelating agent is included. This chelating agent should prevent the interference of polyvalent cations and should not itself interfere. Examples of such chelating agents include ethylenediamine tetra acetic acid, sodium hexametaphosphate, and sodium salicylate; sodium hexametaphosphate is preferred.

Experiments similar to those already described were performed using a chelating agent in addition to the other ingredients of the compositions. Table V shows the results of experiments on kerosene and Table VI on crude oil where the basic composition was used, and Tables VII and VIII show the results of experiments on kerosene and crude oil respectively, where the coupling agent composition was used.

TABLE VII.—FRICTION REDUCTION USING BASIC COMPOSITION

[10 l. kerosene]

| Polyacrylamide hydrolyzed 35% (gm./10 l.) | Water (ml./10 l.) | Dispersing agent Type | Dispersing agent Quantity (gm./10 l.) | Sodium hexametaphosphate (gm./10 l.) | Maximum friction reduction (percent) | Stability (min.) |
|---|---|---|---|---|---|---|
| 6 | 300 | {Pluronic L-81<br>Aromox T-12} | {2<br>2} | 2 | 66 | 300+ |

TABLE VIII.—FRICTION REDUCTION USING BASIC COMPOSITION

[10 l. crude oil]

| Polyacrylamide hydrolyzed 35% (gm. 10 l.) | Water (ml./10 l.) | Dispersing agent Type | Dispersing agent Quantity (gm. 10 l.) | Sodium hexametaphosphate (gm./10 l.) | Maximum friction reduction (percent) | Stability (min.) |
|---|---|---|---|---|---|---|
| 6 | 300 | {Pluronic L-81<br>Aromox T-12} | {1<br>½} | 3 | 53 | 55 |
| 6 | 300 | {Pluronic L-81<br>Aromox T-12} | {1<br>0.3} | 3 | 52 | 60 |
| 6 | 500 | {Pluronic L-81<br>Aromox T-12} | {1<br>0.3} | 3 | 54 | 60 |
| 6 | 300 | Renex-31 | 1 | 3 | 54 | 30 |
| 6 | 300 | Pluronic L-92 | 1 | 3 | 54 | 35 |
| 6 | 300 | {Pluronic L-81<br>Surfonic JN-70} | {1<br>1} | 3 | 54 | 55 |
| 6 | 300 | Surfonic JN-70 | 2 | 3 | 55 | 35 |
| 6 | 300 | Atlox-1256 | 1 | 3 | 53 | 40 |
| 6 | 200 | {Pluronic L-81<br>Aromox T-12} | {1<br>0.3} | 3 | 56 | 45 |
| 6 | 300 | Pluronic L-81 | 0.8 | 3 | 56 | 55 |
| 6 | 300 | {Pluronic L-81<br>Aromox T-12} | {0.3<br>0.3} | 2 | 53 | 40 |
| 6 | 500 | Pluronic L-81 | 1 | 2 | 54 | 60 |
| 6 | 300 | do | 0.5 | 3 | 58 | 55 |
| 6 | 300 | {Pluronic L-81<br>Aromox T-12} | {8<br>8} | 10 | 58 | 70 |

Renex-31 is a polyoxyethylene ester of mixed fatty and resin acids, a product of Atlas Chemical Industries.

Pluronic L-92 is a block polymer of polyoxyethylene and polyoxypropylene, a product of Jefferson Chemical Company.

Surfonic JN-70 is a primary alcohol-ethylene oxide adduct, a product of Wyandotte Chemicals Corporation.

Atlox-1256 is a polyoxyethylene sorbitol ester of mixed fatty and resin acids, a product of Atlas Chemical Industries.

TABLE IX.—FRICTION REDUCTION USING COUPLING AGENT COMPOSITION

[10 l. kerosene]

| Polyacrylamide hydrolized 35% (gm./10 l.) | Water (ml./10 l.) | Coupling agent | | Dispersing agent | | Sodium hexameta-phosphate (gm./10 l.) | Maximum friction reduction (percent) | Stability (min.) |
|---|---|---|---|---|---|---|---|---|
| | | Type | Quantity (ml./10 l.) | Type | Quantity (gm./10 l.) | | | |
| 6 | 300 | Glycerine | 10 | Pluronic L-81 | 1.0 | 3 | 56 | 75 |

TABLE X.—FRICTION REDUCTION USING COUPLING AGENT COMPOSITION

[10 l. crude oil]

| Polyacrylamide hydrolized (gm./10 l.) | Water (ml./10 l.) | Coupling agent | | Dispersing agent | | Sodium hexameta-phosphate (gm./10 l.) | Maximum friction reduction (percent) | Stability (min.) |
|---|---|---|---|---|---|---|---|---|
| | | Type | Quantity (ml., 10 l.) | Type | Quantity (gm./10 l.) | | | |
| 6 | 300 | Glycerol | 10 | Pluronic L-81 / Aromox T-12 | 1 / 0.5 | 3 | 58 | 70 |
| 4 | 200 | do | 10 | Pluronic L-81 | 1 | 3 | 53 | 30 |
| 3 | 300 | do | 10 | Pluronic L-81 / Aromix T-12 | 1 / 0.5 | 3 | 56 | 35 |
| 6 | 300 | do | 10 | Pluronic L-81 / Aromox T-12 | 1 / 0.5 | 3 | 54 | 60 |
| 6 | 300 | Carbowax-6000 | (¹) | Pluronic L-81 / Aromox T-12 | 1 / 0.5 | 3 | 53 | 60 |
| 6 | 300 | Isopropanol | 50 | Pluronic L-81 / Aromox T-12 | 1 / 0.5 | 3 | 55 | 55 |
| 6 | 300 | Glycerol | 50 | Pluronic L-81 / Aromox T-12 | 1 / 0.5 | 3 | 56 | 190 |
| 6 | 300 | do | 10 | Pluronic L-81 | 1 | 3 | 54 | 95 |
| 6 | 300 | do | 10 | Pluronic L-81 / Aromox T-12 | 1 / 0.5 | 3 | 54 | 105 |

¹ 5 gm.

NOTE.—Carbowax-6000 is a polyethylene oxide polymer, a product of Union Carbide

Generally, about 1 percent to 10 percent of our composition is added to the oil-based fracturing fluid; preferably, about 3 percent to 5 percent is added. Satisfactory results are obtained when the water is added before the other ingredients.

Many oil-based fracturing fluids contain a fluid loss additive such as Adomite "Mark II", a product of Continental Oil Company. Our compositions function equally as well in the presence of these additives.

Our invention is not restricted to the specific examples and illustrations recited herein. It may be otherwise variously practiced within the scope of the following claims.

We claim:

1. Method of inhibiting energy loss during the turbulent flow of a hydrocarbon fluid through a pipe comprising emusifying in said hydrocarbon fluid from about 1 to about 10 percent by weight of a composition comprising:
  a. about 85 percent to 99.8 percent water;
  b. about 0.1 percent to about 10 percent polyacrylamide having a molecular weight of at least 3 million; and
  c. about 0.1 percent to about 15 percent dispersing agent from the group consisting of anionic and nonionic surface active agents effective for emulsifying said composition in said hydrocarbon fluid.

2. Method of claim 1 in which about 5 percent to about 40 percent of the amide groups in the polyacrylamide are hydrolyzed.

3. Method of claim 1 in which the composition comprises:
  a. about 96 percent to about 99 percent water;
  b. about 1 percent to about 3.9 percent polyacrylamide having a molecular weight of at least 3 million; and
  c. at least about 0.1 percent of the dispersing agent.

4. Method of claim 1 in which a small amount of a coupling agent selected from the group consisting of monofunctional alcohols having 3—5 carbon atoms and polyfunctional alcohols selected from the group consisting of glycerine and polyvinylalcohol is also added to the oil.